United States Patent Office 3,538,076
Patented Nov. 3, 1970

3,538,076
ACYL DERIVATIVES OF ERYTHROMYCYLAMINE
Zrinka B. Tamburasev, Gabrijela Vazdar-Kobrehel, and Slobodan Djokic, Zagreb, Yugoslavia, assignors to Pliva, Pharmaceutical and Chemical Works, Zagreb, Yugoslavia
No Drawing. Filed July 16, 1968, Ser. No. 745,105
Claims priority, application Yugoslavia, Aug. 3, 1967, P 1,541/67
Int. Cl. C07c 47/18
U.S. Cl. 260—210  16 Claims

ABSTRACT OF THE DISCLOSURE

Antibiotic acyl derivatives of 9-amino-3-O-cladinosyl-5-O-desosaminyl-6,11,12-trihydroxy - 2,4,6,8,10,12 - hexamethylpentadecane-13-olide (erythromycylamine) and to the preparation thereof.

---

It is known that acrylation of erythromycine with different acid chlorides or acid anhydrides yields a variety of products with a single acyl grouping bound to the hydroxyl group of the desosaminyl rest. The sole exception is with the use of acetic anhydride as an acylating agent to yield erythromycine diacetate. Some erythromycine esters, such as propionate, ethylsuccinate, ethylcarbonate, have been recommended in therapeutic praxis owing to their advantages over the erythromycine itself.

Since erythromycylamine of the formula

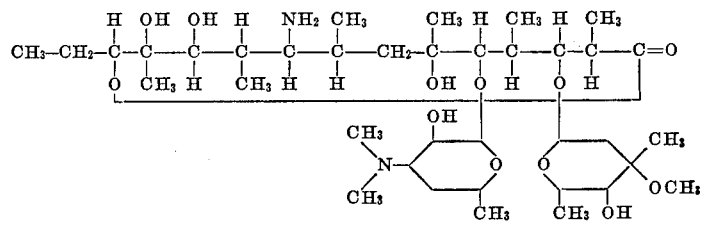

possesses one additional group (amino) which can be acylated it is possible to prepare mono- and bis-acyl derivatives thereof.

It has now been found that mono- and bis-acyl derivatives can be prepared by the reaction of erythromycylamine with acid chlorides of aliphatic and aromatic monocarboxylic acids of the formula RCOCl wherein R is an alkyl radical with 2 to 17 carbon atoms or a phenyl radical, with chlorides of dicarboxylic acid esters of the formula $ClOC(CH_2)_nCOOR'$ wherein R' is a lower alkyl radical (methyl, ethyl) and $n$ is 1 to 4, in the presence of an alkaline metal salt, such as e.g. sodium hydrogen carbonate. If this acylation is carried out in an inert anhydrous solvent, such as acetone, using an equivalent quantity or a small excess of the acylating agent in the presence of an alkaline metal salt at room temperature, exclusively mono-acyl derivatives can be obtained. With a slight excess over two equivalents of the acylating agent in the presence of the double amount of an alkaline salt in the solution of same inert anhydrous solvent at elevated temperature, corresponding bis-acyl derivatives are formed.

The antibiotic activities of the obtained mono- and bis-acyl derivatives determined on *Bacillus subtilis* and *Bacillus mycoides* are listed in Table I.

Table I

| Acyl radical: | Antibiotic activity U/mg. |
|---|---|
| Mono-propionate | 300–350 |
| Mono-palmitate | In traces |
| Mono-stearate | In traces |
| Mono-benzoate | In traces |
| Mono-methylsuccinate | 400–450 |
| Mono-ethylsuccinate | 250–300 |
| Mono-methyladipate | 400–450 |
| Mono-ethyladipate | 350–400 |
| Bis-propionate | 200–250 |
| Bis-palmitate | In traces |
| Bis-stearate | In traces |
| Bis-benzoate | In traces |
| Bis-methylsuccinate | 450–500 |
| Bis-ethylsuccinate | 200–250 |
| Bis-methyladipate | 400–450 |
| Bis-ethyladipate | 200–250 |

From the cited table it can be seen that of the acyl derivatives prepared by us with chlorides of aliphatic and aromatic mono-carboxylic acids erythromycylamine propionates are highly active. All acyl derivatives prepared with chlorides of aliphatic dicarboxylic acid esters possess well defined antibiotic activity.

The following example in which the novel acyl derivatives of erythromycylamine are provided by the invention is given by way of illustration:

EXAMPLE 1

Erythromycylamine mono-propionate

To a solution of 5 g. (6.8 mmoles) of erythromycylamine in 100 ml. of dry acetone, 2.5 g. of dry sodium hydrogen carbonate was added. Then the solution of 0.790 g. (8.8 mmoles) of propionyl chloride in 25 ml. of dry acetone was added dropwise with stirring over a period of one hour. After stirring for one additional hour the reaction mixture was filtered, the filtrate diluted with a solution of 2.5 g. of sodium hydrogen carbonate in 130 ml. water and extracted with one 100 ml. and two 50 ml. portions of ether. The combined ether extracts were dried over anhydrous sodium sulfate, filtered, and freed from ether in vacuo. For analysis the substance was purified by dissolution in acetone and addition of water until persistent turbidity. After standing for three hours crystallisation set in. The yield 4.10 g. (76.2%), M.P. 122–126° C.

*Analysis.*—Calculated for $C_{40}H_{74}N_2O_{13}$ (percent): C, 60.73; H, 9.43; N, 3.54. Found (percent): C, 60.92; H, 9.59; N, 3.21.

EXAMPLE 2

Erythromycylamine mono-palmitate

From 5 g. (6.8 mmoles) of erythromycylamine, 2.0 g. (7.28 mmoles) of palmitoyl chloride and 2.5 g. of sodium hydrogen carbonate by the process described in Example 1 there are obtained 4.78 g. (73.3%) of mono-palmitate, M.P. 62–67° C.

*Analysis.*—Calculated for $C_{53}H_{100}N_2O_{13}$ (percent): C, 65.39; H, 10.36; N, 2.87. Found (percent): C, 67.57; H, 10.42; N, 2.68.

EXAMPLE 3

Erythromycylamine mono-stearate

From 5 g. (6.8 mmoles) of erythromycylamine, 2.5 g. (8.26 mmoles) of stearoyl chloride and 2.5 g. of sodium hydrogen carbonate by the process described in Example 1 there are obtained 4.81 g. (70.6%) of mono-stearate, M.P. 63–66° C.

Analysis.—Calcd. for $C_{55}H_{104}N_2O_{13}$ (percent): C, 65.96; H, 10.47; N, 2.80. Found (percent): C, 65.68; H, 10.77; N, 2.64%.

EXAMPLE 4

Erythromycylamine mono-benzoate

From 5 g. (6.8 mmoles) of erythromycylamine, 1.26 g. (8.64 mmoles) of benzoyl chloride and 2.5 g. of sodium hydrogen carbonate by the process described in Example 1 there are obtained 4.26 g. (74%) of mono-benzoate, M.P. 180–187° C.

Analysis.—Calcd. for $C_{44}H_{74}N_2O_{13}$ (percent): C, 62.98; H, 8.88; N, 3.33. Found (percent): C, 62.69; H, 8.56; N, 3.11.

EXAMPLE 5

Erythromycylamine mono-methylsuccinate

From 5 g. (6.8 mmoles) of erythromycylamine, 1.024 g. (6.8 mmoles) of succinic acid methyl ester chloride and 2.5 g. of sodium hydrogen carbonate by the process described in Example 1 there are obtained 4.52 g. (78.5%) of mono-methylsuccinate, M.P. 114–119° C.

Analysis.—Calcd. for $C_{43}H_{78}N_2O_{15}$ (percent): C, 59.40; H, 9.02; N, 3.33. Found (percent): C, 59.63; H, 8.77; N, 3.28.

EXAMPLE 6

Erythromycylamine mono-ethylsuccinate

From 5 g. (6.8 mmoles) of erythromycylamine, 1.118 g. (6.8 mmoles) of succinic acid ethylester chloride and 2.5 g. of sodium hydrogen carbonate by the process described in Example 1 there are obtained 4.8 g. (81.7%) of ethylsuccinate, M.P. 103–105° C.

Analysis.—Calcd. for $C_{43}H_{76}N_2O_{15}$ (percent): C, 59.83; H, 9.11; N, 3.04. Found (percent): C, 59.61; H, 9.28; N, 3.51.

EXAMPLE 7

Erythromycylamine mono-methyladipate

From 5 g. (6.8 mmoles) of erythromycylamine, 1.31 g. (6.8 mmoles) of adipic acid methylester chloride and 2.5 g. of sodium hydrogen carbonate by the process described in Example 1 there are obtained 4.75 g. (79.6%) of mono-methyladipate, M.P. 102–105° C.

Analysis.—Calcd. for $C_{44}H_{80}N_2O_{15}$ (percent): C, 60.25; H, 9.19; N, 3.19. Found (percent): C, 59.97 H, 8.84; N, 2.96.

EXAMPLE 8

Erythromycylamine mono-ethyladipate

From 5 g. (6.8 mmoles) of erythromycylamine, 1.31 g. (6.8 mmoles) of adipic acid ethylester chloride and 2.5 g. of sodium hydrogen carbonate by the process described in Example 1 there are obtained 4.7 g. (76.8%) of mono-ethyladipate, M.P. 91–95° C.

Analysis.—Calcd. for $C_{45}H_{82}N_2O_{15}$ (percent): C, 60.65: H, 9.28; N, 3.14. Found (percent): C, 60.54; H, 9.20; N, 2.98.

EXAMPLE 9

Erythromycylamine bis-propionate

To a solution of 5 g. (6.8 mmoles) of erythromycylamine in 100 ml. of dry acetone, 5.0 g. of dry sodium hydrogen carbonate was added. Then the solution of 1.596 g. (17.78 mmoles) of propionyl chloride in 50 ml. of dry acetone was added dropwise with stirring over a period of one hour. The stirring was continued for additional 8 hours while heating the reaction mixture under reflux. After cooling to room temperature and filtration, the clear filtrate was diluted with a solution of 5 g. of sodium hydrogen carbonate in 250 ml. water and extracted with one 100 ml. and two 50 ml. portions of ether. The isolation of the product was performed in the same manner as described in Example 1. The yield 4.38 g. (76.1%), M.P. 194–195° C.

Analysis.—Calcd. for $C_{43}H_{78}N_2O_{14}$ (percent): C, 60.96; H, 9.28; N, 3.31. Found (percent): C, 60.72; H, 9.36; N, 3.01.

EXAMPLE 10

Erythromycylamine bis-palmitate

From 5 g. (6.8 mmoles) of erythromycylamine, 4.5 g. (16.38 mmoles) of palmitoyl chloride and 5 g. of sodium hydrogen carbonate by the process described in Example 9 there are obtained 6.13 g. (74%) of bis-palmitate, M.P. 65–67° C.

Analysis.—Calcd. for $C_{69}H_{130}N_2O_{14}$ (percent): C, 68.39; H, 10.81; N, 2.31. Found (percent): C, 68.57; H, 10.73; N, 2.54.

EXAMPLE 11

Erythromycylamine bis-stearate

From 5 g. (6.8 mmoles) of erythromycylamine, 5 g. (16.52 mmoles) of stearoyl chloride and 5 g. of sodium hydrogen carbonate by the process described in Example 9 there are obtained 6.54 g. (75.8%) of bis-stearate, M.P. 61–63° C.

Analysis.—Calcd. for $C_{73}H_{138}N_2O_{14}$ (percent): C, 69.15; H, 10.97; N, 2.21. Found (percent): C, 69.47; H, 10.71; N, 2.44.

EXAMPLE 12

Erythromycylamine bis-benzoate

From 5 g. (6.8 mmoles) of erythromycylamine, 2.52 g. (17.28 mmoles) of benzoyl chloride and 5 g. of sodium hydrogen carbonate by the process described in Example 9 there are obtained 4.8 g. (74%) of bis-benzoate, M.P. 192–195° C.

Analysis.—Calcd. for $C_{51}H_{78}N_2O_{14}$ (percent): C, 64.95; H, 8.33; N, 2.97. Found (percent): C, 64.45; H, 8.67; N, 2.69.

EXAMPLE 13

Erythromycylamine bis-methylsuccinate

From 5 g. (6.8 mmoles) of erythromycylamine, 2.4 g. (16.1 mmoles) of succinic acid methylester chloride and 5 g. of sodium hydrogen carbonate by the process described in Example 9 there are obtained 5.0 g. (76.4%) of bis-methylsuccinate, M.P. 95–101° C.

Analysis.—Calcd. for $C_{47}H_{82}N_2O_{18}$ (percent): C, 58.60; H, 8.58; N, 2.90. Found (percent): C, 58.65; H, 8.50; N, 3.17.

EXAMPLE 14

Erythromycylamine bis-ethylsuccinate

From 5 g. (6.8 mmoles) of erythromycylamine, 2.649 g. (16.1 mmoles) of succinic acid ethylester chloride and 5 g. of sodium hydrogen carbonate by the process described in Example 9 there are obtained 5.20 g. (77.2%) of bis-ethylsuccinate, M.P. 160–162° C.

Analysis.—Calcd. for $C_{49}H_{86}N_2O_{18}$ (percent): C, 59.37; H, 8.75; N, 2.82. Found (percent): C, 59.81; H, 8.69; N, 3.31.

EXAMPLE 15

Erythromycylamine bis-methyladipate

From 5 g. (6.8 mmoles) of erythromycylamine, 2.87 g. (16.1 mmoles) of adipic acid methylester chloride and 5 g. of sodium hydrogen carbonate by the process described in Example 9 there are obtained 5.25 g. (75.6%) of bis-methyladipate, M.P. 88–90° C.

Analysis.—Calcd. for $C_{51}H_{90}N_2O_{18}$ (percent): C, 60.09; H, 8.80; N, 2.75. Found (percent): C, 59.97; H, 8.84; N, 2.96.

EXAMPLE 16

Erythromycylamine bis-ethyladipate

From 5 g. (6.8 mmoles) of erythromycylamine, 3.102 g. (16.1 mmoles) of adipic acid ethylester chloride and 5 g. of sodium hydrogen carbonate by the process described in Example 9 there are obtained 5.65 g. (78.8%) of bis-ethyladipate, M.P. 69–71° C.

*Analysis.*—Calcd. for $C_{53}H_{94}N_2O_{18}$ (percent): C, 60.78; H, 9.05; N, 2.68. Found (percent): C, 60.60; H, 9.35; N, 2.86.

What we claim is:
1. Erythromycylamine mono-propionate.
2. Erythromycylamine mono-palmitate.
3. Erythromycylamine mono-stearate.
4. Erythromycylamine mono-benzoate.
5. Erythromycylamine mono-methylsuccinate.
6. Erythromycylamine mono-ethylsuccinate.
7. Erythromycylamine mono-methyladipate.
8. Erythromycylamine mono-ethyladipate.
9. Erythromycylamine bis-propionate.
10. Erythromycylamine bis-palmitate.
11. Erythromycylamine bis-stearate.
12. Erythromycylamine bis-benzoate.
13. Erythromycylamine bis-methylsuccinate.
14. Erythromycylamine bis-ethylsuccinate.
15. Erythromycylamine bis-methyladipate.
16. Erythromycylamine bis-ethyladipate.

References Cited
UNITED STATES PATENTS

| 2,862,921 | 12/1958 | Booth et al. |
| 2,967,129 | 1/1961 | Clarke. |
| 2,993,833 | 7/1961 | Stephens. |
| 3,014,027 | 12/1961 | Druey et al. _____ 260—211 |

OTHER REFERENCES

Flynn et al., "Jour. Amer. Chem. Soc." vol. 77, 1955, p. 3104.

LEWIS GOTTS, Primary Examiner

J. R. BROWN, Assistant Examiner

U.S. Cl. X.R.
260—999